(12) United States Patent
Schlomer et al.

(10) Patent No.: US 7,788,231 B2
(45) Date of Patent: Aug. 31, 2010

(54) USING A HEARTBEAT SIGNAL TO MAINTAIN DATA CONSISTENCY FOR WRITES TO SOURCE STORAGE COPIED TO TARGET STORAGE

(75) Inventors: Todd Benjamin Schlomer, Tucson, AZ (US); David Randall Blea, Tucson, AZ (US); Errol Jay Calder, Vail, AZ (US); Gregory Edward McBride, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 11/379,204

(22) Filed: Apr. 18, 2006

(65) Prior Publication Data

US 2007/0244936 A1 Oct. 18, 2007

(51) Int. Cl.
*G06F 7/00* (2006.01)
*G06F 17/00* (2006.01)
*G06F 17/30* (2006.01)
(52) U.S. Cl. .................. 707/657; 707/655; 707/656
(58) Field of Classification Search ............... 707/10, 707/204; 712/11; 714/12
See application file for complete search history.

(56) References Cited

U.S. PATENT DOCUMENTS

| | | | |
|---|---|---|---|
| 5,894,583 A * | 4/1999 | Johnson et al. | 710/48 |
| 5,928,367 A | 7/1999 | Nelson et al. | |
| 6,691,245 B1 | 2/2004 | DeKoning | |
| 6,785,840 B1 * | 8/2004 | Smith et al. | 714/11 |
| 6,804,703 B1 | 10/2004 | Allen et al. | |
| 6,834,302 B1 * | 12/2004 | Harvell | 709/224 |
| 6,898,791 B1 * | 5/2005 | Chandy et al. | 719/314 |
| 6,934,725 B1 | 8/2005 | Dings | |
| 6,957,221 B1 * | 10/2005 | Hart et al. | 707/100 |
| 7,263,537 B1 * | 8/2007 | Lin et al. | 707/204 |
| 7,334,092 B1 * | 2/2008 | Wang et al. | 711/158 |
| 7,467,265 B1 * | 12/2008 | Tawri et al. | 711/161 |
| 2002/0095489 A1 | 7/2002 | Yamagami | |
| 2003/0212869 A1 | 11/2003 | Burkey | |
| 2004/0064659 A1 | 4/2004 | Achiwa et al. | |

(Continued)

OTHER PUBLICATIONS

G. Castets, et al., "IBM TotalStorage Enterprise Storage Server PPRC Extended Distance", IBM Corporation, Document No. SG24-6568-00, Jun. 2002.

*Primary Examiner*—Apu M Mofiz
*Assistant Examiner*—Susan Y Chen
(74) *Attorney, Agent, or Firm*—David W. Victor; Konrad Raynes & Victor LLP

(57) ABSTRACT

Provided are a method, system, and program for using a heartbeat signal to maintain data consistency for writes to source storage copied to target storage. A copy relationship associates a source storage and target storage pair, wherein writes received at the source storage are transferred to the target storage. A determination is made whether a signal has been received from a system within a receive signal interval. A freeze operation is initiated to cease receiving writes at the source storage from an application in response to determining that the signal has not been received within the receive signal interval. A thaw operation is initiated to continue receiving write operations at the source storage from applications after a lapse of a freeze timeout in response to the freeze operation, wherein after the thaw operation, received writes completed at the source storage are not transferred to the target storage.

20 Claims, 5 Drawing Sheets

U.S. PATENT DOCUMENTS

| | | |
|---|---|---|
| 2005/0080891 A1 | 4/2005 | Cauthron |
| 2005/0080895 A1 | 4/2005 | Cook |
| 2005/0081091 A1 | 4/2005 | Bartfai et al. |
| 2005/0108187 A1 | 5/2005 | Fujibayashi |
| 2005/0229034 A1 | 10/2005 | Fujibayashi |
| 2007/0168713 A1* | 7/2007 | Kern et al. .................. 714/12 |

* cited by examiner

Consistency Group Information

Primary Control Unit Information

USING A HEARTBEAT SIGNAL TO MAINTAIN DATA CONSISTENCY FOR WRITES TO SOURCE STORAGE COPIED TO TARGET STORAGE

BACKGROUND OF THE INVENTION

1. Field of the Invention

The present invention relates to a method, system, and program for using a heartbeat signal to maintain data consistency for writes to source storage copied to target storage.

2. Description of the Related Art

Disaster recovery systems typically address two types of failures, a sudden catastrophic failure at a single point in time or data loss over a period of time. In the second type of gradual disaster, updates to volumes may be lost. To assist in recovery of data updates, a copy of data may be provided at a remote location. Such dual or shadow copies are typically made as the application system is writing new data to a primary storage device. Different copy technologies may be used for maintaining remote copies of data at a secondary site, such as International Business Machine Corporation's ("IBM") Extended Remote Copy (XRC), Coupled XRC (CXRC), Global Copy, and Global Mirror Copy. These different copy technologies are described in the IBM publications "The IBM TotalStorage DS6000 Series: Copy Services in Open Environments", IBM document no. SG24-6783-00 (September 2005) and "IBM TotalStorage Enterprise Storage Server: Implementing ESS Copy Services with IBM eServer zSeries", IBM document no. SG24-5680-04 (July 2004).

In data mirroring systems, data is maintained in volume pairs. A volume pair is comprised of a volume in a primary storage device and a corresponding volume in a secondary storage device that includes an identical copy of the data maintained in the primary volume. Primary and secondary control units, also known as storage controllers or enterprise storage servers, may be used to control access to the primary and secondary storage devices. In certain backup system, a sysplex timer is used to provide a uniform time across systems so that updates written by different applications to different primary storage devices use consistent time-of-day (TOD) value as a time stamp. Application systems time stamp data sets when writing such data sets to volumes in the primary storage. The integrity of data updates is related to ensuring that updates are done at the secondary volumes in the volume pair in the same order as they were done on the primary volume. The time stamp provided by the application program determines the logical sequence of data updates.

In peer-to-peer remote copy operations (PPRC), multiple primary control units may have source/target pairs, i.e., volume pairs, included in consistency groups so that data copied to target volumes by the different primary control units maintains data consistency. A host system includes a program, referred to as a consistency manager, to maintain data consistency across the different primary control units having source/target pairs in a consistency group. In the current art, if a primary control unit detects an error, such as a failure with the connection to secondary control unit managing access to the target storage in the source/target pair, then the primary control unit may initiate a freeze operation to block any further writes to the source volumes. In response to the freeze operation, application programs blocked from writing data would not write any more data to any primary control unit. After initiating the freeze operation, the primary control unit would send an interrupt to the consistency manager identifying the freeze and set a freeze timeout timer. At the expiration of the freeze timeout timer, the primary control unit would initiate a thaw operation to start accepting writes from the application to the source storage in the source/target pair, but not copy the writes to the target storage.

In the current art, if the primary control unit cannot communicate the interrupt to the consistency manager to allow the consistency manager to send freeze commands to all primary control units, then applications writing to primary control units other than the primary control unit where the freeze occurred may have their data writes transferred to the target storage even though data at the primary control unit where the freeze occurred would not copy writes to the target storage. This may result in data inconsistency at the target storage.

For these reasons, there is a need in the art to provide techniques for maintaining data consistency.

SUMMARY

Provided are a method, system, and program for using a heartbeat signal to maintain data consistency for writes to source storage copied to target storage. A copy relationship associates a source storage and target storage pair, wherein writes received at the source storage are transferred to the target storage. A determination is made whether a signal has been received from a system within a receive signal interval. A freeze operation is initiated to cease receiving writes at the source storage from an application in response to determining that the signal has not been received within the receive signal interval. A thaw operation is initiated to continue receiving write operations at the source storage from applications after a lapse of a freeze timeout in response to the freeze operation, wherein after the thaw operation, received writes completed at the source storage are not transferred to the target storage.

In an additional embodiment, there is information on multiple source storage and target storage pairs maintained by control units, wherein the control unit maintaining the pair copies writes to the source storage to the target storage. A determination is made of freeze timeouts used by control units maintaining the source and target pairs. In response to a freeze operation with respect to one source and target pair managed by one control unit, the control unit blocks writes to the source storage. The control unit initiates a thaw operation to continue receiving write operations at the source storage after a lapse of the freeze timeout for the source and target pair in response to the freeze operation. After the thaw operation, received writes completed at the source storage are not transferred to the target storage. A determination is made of a send signal interval based on the determined freeze timeouts. A signal is communicated at the send signal interval to the control units maintaining the source and target pairs.

DETAILED DESCRIPTION

Figure 1:
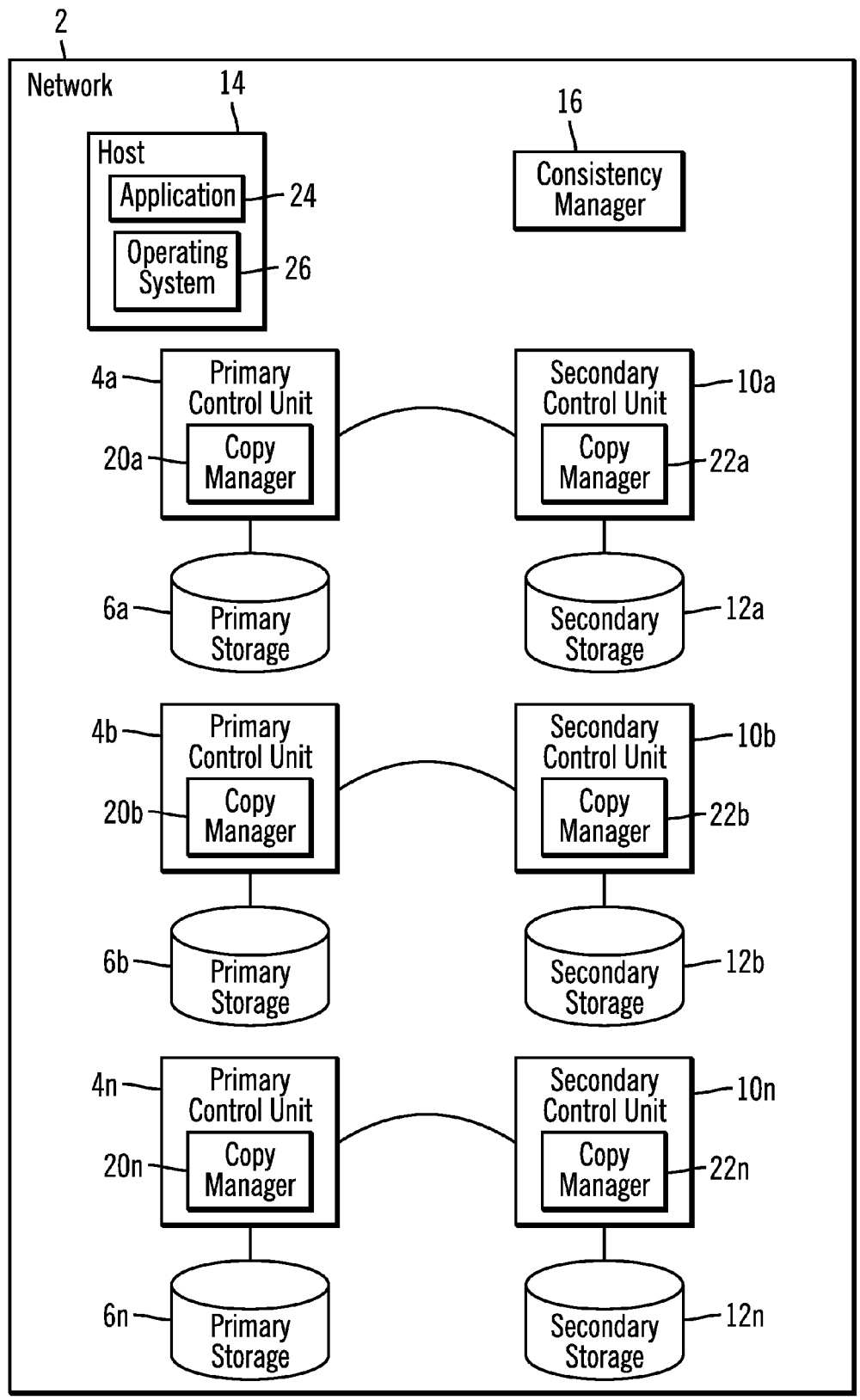
FIG. 1 illustrates an embodiment of a network computing environment.

FIG. 1 illustrates an embodiment of a network computing environment. A network 2 includes a plurality of primary control units 4a . . . 4n; primary storages 6a . . . 6n; secondary storages 12a . . . 12n; a host 14 writing updates to the primary storages 6a . . . 6n; and a consistency manager 16 maintaining data consistency among source and target storage pairs managed by the primary 4a . . . 4n and secondary 10a . . . 10n control units. The components 4a . . . 4n, 6a . . . 6n, 12a . . . 12n, 14, 16, and 18, are connected to the network 2 and the network 2 enables communication among these components. The network 2 may include one or more switches to provide one or more paths of communication between the different network 2 elements.

The primary 4a . . . 4n and secondary 10a . . . 10n control units include copy manager software 20a . . . 20n and 22a . . . 22n, respectively, that manages the copying of writes to locations in the primary storages 6a . . . 6n in a source/target copy pair to target storage 10a . . . 10n indicated in the source/target copy pair information. The primary copy manager 20a . . . 20n may read updates from the primary storages 6a . . . 6n and send the writes to the primary control unit 4a . . . 4n that manages the copying of the writes in the order in which they were written to the primary storages 6a . . . 6n to the corresponding secondary storage 12a . . . 12n (target). The dependent order of the writes may be maintained by writing the data synchronously, so that the data will be on the target and source storage before the application 24 is allowed to proceed with a next write. Therefore, the data will be consistent on the targets as a result of the application 24 using ordered dependent writes for data that needs to be consistent with itself. Thus, when data is recovered from the target storage, i.e., secondary storage 12a . . . 12n, the recovered data will be consistent.

The copy managers 20a . . . 20n, 22a . . . 22n may copy data by sending the writes to the primary control units 4a . . . 4n, which then manage and initiate the synchronously copying from the source to the storage using a technique such as peer-to-peer remote copy (PPRC). Complete may be returned to the application 24 providing the writes upon completing the write at the primary control unit 4a . . . 4n or the secondary control unit 10a . . . 10n. Alternatively, the primary control units 4a . . . 4n may copy data asynchronously using remote copy technology.

The consistency manager 16 maintains consistency across storage/target pairs managed by primary control units 4a . . . 4n. Each primary control unit 4a . . . 4n includes information on one or more copy relationship, each copy relationship specifying source locations in the primary storage 6a . . . 6n, e.g., LSSs, volumes, etc., copied to corresponding target locations in the secondary storage 12a . . . 12n.

The network 2 may comprise a Storage Area Network (SAN), Local Area Network (LAN), Intranet, the Internet, Wide Area Network (WAN), peer-to-peer network, arbitrated loop network, etc. The storages 6a . . . 6n, 12a . . . 12n may comprise an array of storage devices, such as a Just a Bunch of Disks (JBOD), Direct Access Storage Device (DASD), Redundant Array of Independent Disks (RAID) array, virtualization device, tape storage, flash memory, etc.

The consistency manager 16 may be implemented within one of the primary or secondary control units or in a separate system, such as shown in FIG. 1.

Figure 2:
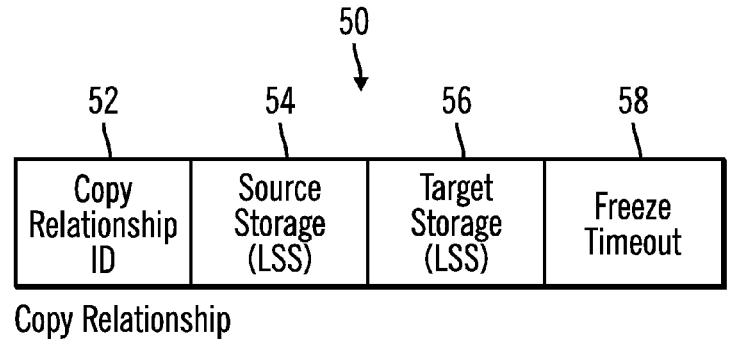
FIG. 2 illustrates an embodiment of information maintained for a copy relationship.

FIG. 2 illustrates an embodiment of copy relationship information maintained by the copy managers 20a . . . 20n and, in certain embodiments, 22a . . . 22n. Each copy relationship 50 instance includes: a copy relationship identifier (ID) 52; the source storage 54 locations, e.g., LSS, in the primary storages 6a . . . 6n involved in the copy relationship; the corresponding target storage 56 locations in the secondary storages 12a . . . 12n to which writes to the source storage 54 locations are copied; and a freeze timeout 58 for the copy relationship 52, e.g., LSS pair. For instance, if a freeze operation is performed at the primary control unit 4a . . . 4n due to some error, then after the freeze timeout time 58 has elapsed for the particular copy relationship 52, the primary control unit 4a . . . 4n automatically initiates a thaw operation to start accepting writes to the source storage 54 locations from the application 24 without copying the writes to the corresponding target storage 56 location. In one embodiment, the copy manager 20a . . . 20n may issue the thaw to the primary control unit 4a . . . 4n before the timeout time if the copy manager 20a . . . 20n determines that all the source LSS pairs have been frozen to ensure data consistency. In this way, the copy manager 20a . . . 20n may maintain different freeze timeouts for different source storage locations 54 involved in copy relationships to allow writes to resume at different times for different source storage locations 54, depending on the freeze timeout times 58 defined in the copy relationship information 50 for that storage location 54.

Figure 3:
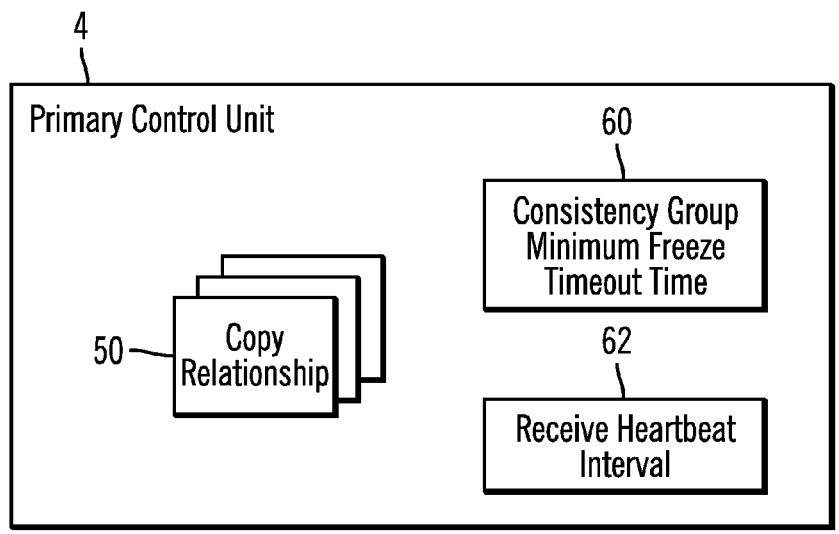
FIG. 3 illustrates an embodiment of copy relationship and other information maintained at the primary control units.

FIG. 3 illustrates further information maintained in a primary control unit 4a . . . 4bn for use by the copy manager 20a . . . 20n, including one or more copy relationships 50, a minimum freeze timeout time 60 indicating a consistency group minimum freeze timeout time used across all the copy relationships in the primary control units 4a, 4b . . . 4n that are managed by the consistency manager 16 in a single consistency group. The consistency manager 16 may provide the copy manager 20a . . . 20n in the primary control units 4a . . . 4n with this value. The receive heartbeat interval 62 is an interval in which the copy manager 20a . . . 20n expects to receive a heartbeat signal from the consistency manager 16.

If the copy manager 20a . . . 20n does not receive the heartbeat signal within the receive heartbeat interval 62, then the copy manager 20a . . . 20n will initiate a freeze operation to quiesce further writes. The freeze operation may be issued to those source-target locations, e.g., LSS pairs, registered in the sessions managed by the copy manager 20a . . . 20n. In one embodiment, the copy manager 20a . . . 20n calculates the receive heartbeat interval 62 as a function of the consistency group minimum freeze timeout time 60, such that the receive heartbeat interval 62 is less than the consistency group minimum freeze timeout time 60. Using the consistency group minimum freeze timeout time to determine the receive heartbeat interval ensures that any one primary control unit 4a . . . 4n would perform a freeze operation before another primary control unit 4a . . . 4n would thaw as a result of the expiration of that primary control unit's 4a . . . 4n freeze timeout times. For instance, if a primary control unit 4a . . . 4n loses connection with the consistency manager 16, then there is a concern that another primary control unit 4a . . . 4n may initiate a freeze operation as a result of some failure to copy writes to the target storage. If one primary control unit lost its connection with the consistency manager 16, then it may continue to copy writes to the target storage after the primary control unit that performed the freeze operation thaws. If this occurs, then target storage may include inconsistent data because one primary control unit is writing dependent data to the target side, while other primary control units that performed the freeze operation do not copy dependent data, resulting in data inconsistency at the target side. With the described embodiments, if the consistency manager 16 is assumed to send the heartbeat signal more frequently than the receive heartbeat interval 62 and the receive heartbeat interval 62 is less than the consistency group minimum freeze timeout time 60 across all primary control units 4a . . . 4n, than all primary control units will freeze before any one of them thaws and permits the application 14 writes to continue. This ensures that all primary control units 4a . . . 4n will not send any further data to the target after any other primary control unit thaws because all primary control units involved in the consistency group will have initiated a freeze operation before any of them would thaw and permit writes after a freeze.

In one embodiment, the receive heartbeat interval 62 may be calculated by subtracting from the minimum freeze timeout time 60 the time it would take the copy manager 20a . . . 20n to issue a freeze operation to all copy relationships 50 maintained at the primary control unit 4a . . . 4n, also known as a command runtime. This takes into account the command runtime for the freeze to be implemented at all copy relationships 50, i.e., all LSSs, so that a primary control unit will issue a freeze operation in enough time to allow the freeze to be implemented at all of its copy relationships 50 before any other primary control unit can thaw and allow the application 14 to continue writes to all primary control units 4a . . . 4n.

Figure 4:
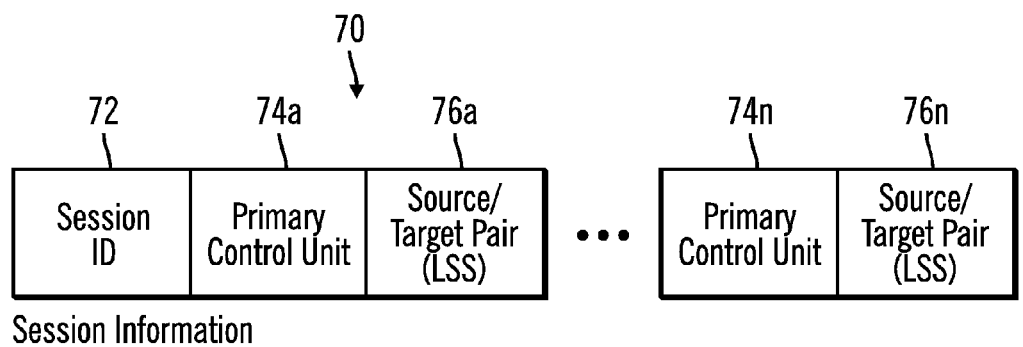
FIG. 4 illustrates an embodiment of session information.

In one embodiment, the consistency manager 16 may maintain a consistency group comprised of one or more sessions. A session includes source/target pairs on one or more primary control units 4a . . . 4n and multiple sessions may include source/target pairs on the same or different primary control units 4a . . . 4n. FIG. 4 illustrates an embodiment of session information 70 having: a session identifier (ID) 72 and then one or more source/target pair instances for each source/target pair included in the session. For each source/target pair included in the session 72, the session information 70 includes the primary control unit 74a . . . 74n and the source/target pair 76a . . . 76n in the primary control unit 74a . . . 74n included in the session 72. The source/target pair 76a . . . 76n information may identify an LSS pair or other storage unit pairs in the primary 6a . . . 6n and secondary 12a . . . 12n storages.

Figure 5:
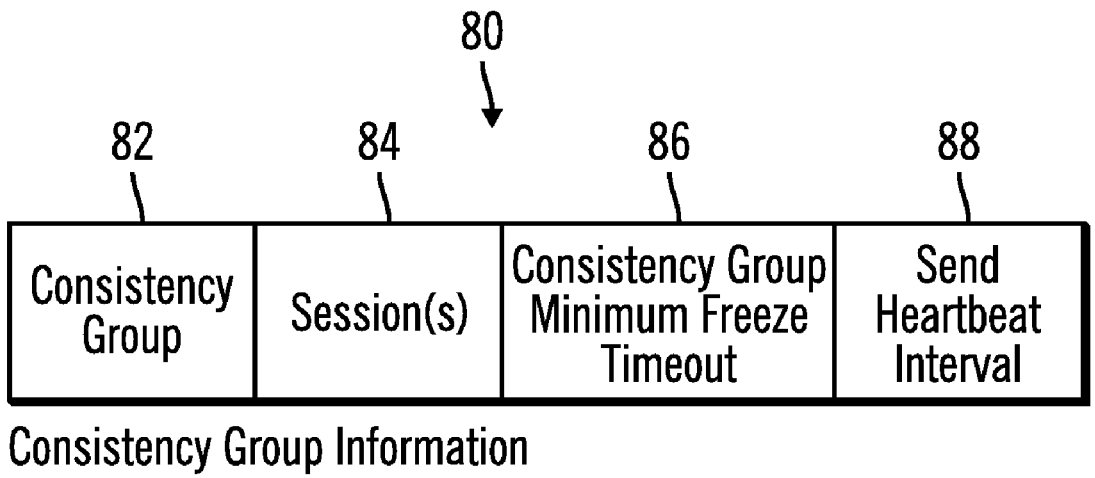
FIG. 5 illustrates an embodiment of consistency group information.

FIG. 5 illustrates an embodiment of consistency group information 80 the consistency manager 16 maintains for each consistency group being managed. The consistency group information 80 includes a consistency group identifier (ID) 82; the one or more sessions 84 included in the consistency group 82, where each session includes one or more source/target pairs in one or more of the connected primary control units 4a . . . 4n; a consistency group minimum freeze timeout time 86 indicating the minimum freeze timeout time across all primary control units 4a, 4b . . . 4n including source/target pairs in the consistency group 82; and a send heartbeat interval 88 calculated from the consistency group minimum freeze timeout time 86 at which the consistency manager 16 sends heartbeat signals to the primary control units 4a . . . 4n managing source/target pairs in the consistency group 82.

Figure 6:
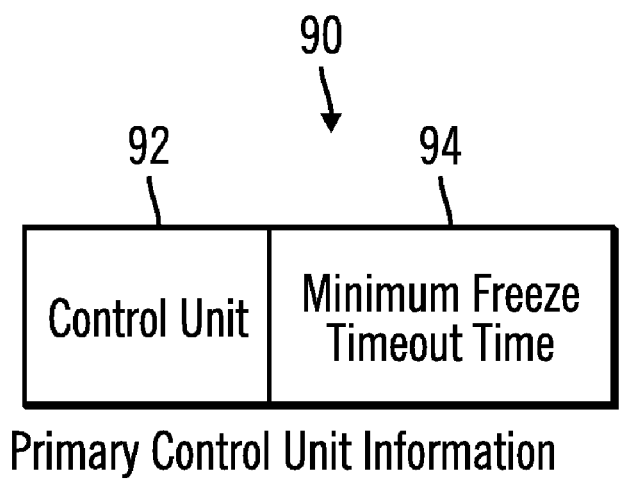
FIG. 6 illustrates an embodiment of primary control unit information.

FIG. 6 illustrates an embodiment of primary control unit information 90 the consistency manager 16 maintains for each primary control unit including source/target pairs in a one consistency group 80. The primary control unit information 90 indicates the control unit 92 and the minimum freeze timeout time 94 of the source/target pairs at that control unit 92.

Figure 7:
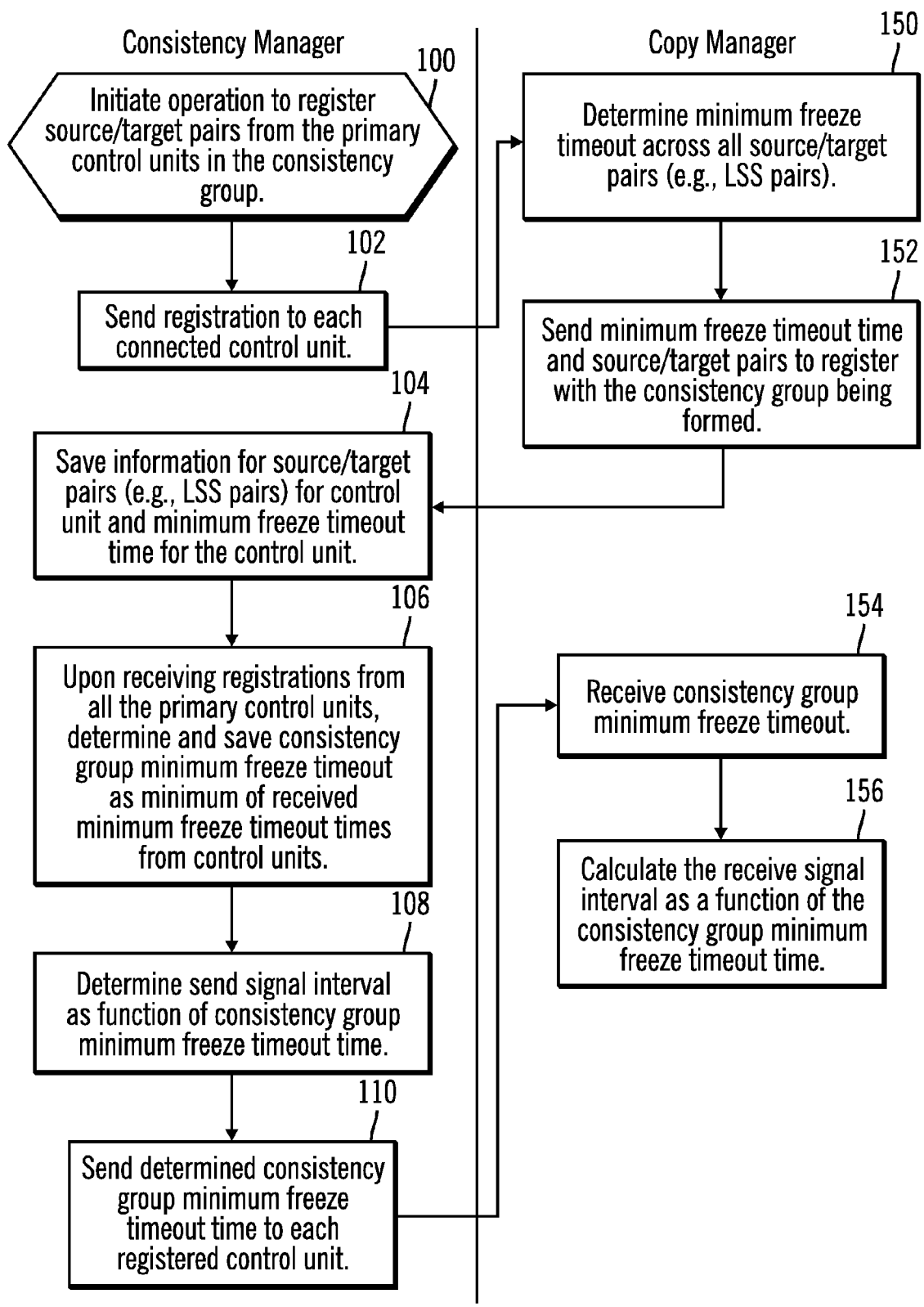
FIG. 7 illustrates an embodiment of operations to register source/target pairs maintained by primary control units to include in a consistency group.

FIG. 7 illustrates an embodiment of operations performed by the consistency manager 16 and the copy manager 20a . . . 20n in the primary control units 4a . . . 4n to exchange information to maintain data consistency with respect to the freeze operation. The consistency manager 16 performs the operations at blocks 100-110 and the copy manager 20a . . . 20n performs the operations at blocks 150-156. Upon the consistency manager 16 initiating (at block 100) operations to register source/target pairs from the primary control units 14a . . . 14n in a consistency group 82 (FIG. 5), the consistency manager 16 sends (at block 102) a registration to each connected primary control unit 4a . . . 4n. Upon receiving this registration request, the copy managers 20a . . . 20n at the primary control units 4a . . . 4n determine (at block 150) a minimum freeze timeout across all source/target pairs (e.g., LSS pairs) to be added to the consistency group being registered. The minimum freeze timeout may be determined across all source/target pairs registered in the sessions managed by the copy managers 20a . . . 20n. The copy manager 20a . . . 20n sends (at block 152) the consistency manager 16 the minimum freeze timeout time at the primary control unit 4a . . . 4n and the source/target pairs to register in the consistency group. The consistency manager 16 saves (at block 104) the received information for source/target pairs (e.g., LSS pairs) for the primary control unit 4a . . . 4n and the minimum freeze timeout time 94 (FIG. 6) for the primary control unit 92 with the primary control unit information 90.

Upon receiving registrations from all the primary control units 4a . . . 4n, the consistency manager 16 determines and saves (at block 106) the consistency group minimum freeze timeout time 86 (FIG. 5) as the determined minimum of the received control unit minimum freeze timeout times 94 (FIG. 6). The consistency manager 16 determines (at block 108) the send signal interval as a function of the consistency group minimum freeze timeout time 86. In one embodiment, the send signal interval comprises a fraction of the receive heartbeat interval 62 (FIG. 3) used by the copy managers 20a . . . 20n. In this way, the consistency manager 16 sends the heartbeats to the primary control units 4a . . . 4n at a higher frequency then the receive heartbeat interval to ensure that the primary control units 4a . . . 4bn initiate freeze operations before other primary control units 4a . . . 4n thaw and begin allowing application 24 writes. The consistency manager 16 sends (at block 110) the determined consistency group minimum freeze timeout time 86 to each primary control unit 4a . . . 4n including source/target pairs in the consistency group 82 (FIG. 5) at issue.

Upon the copy manager 20a . . . 20n at the primary control unit 4a . . . 4n receiving (at block 154) the consistency group minimum freeze timeout 94, the copy manager 20a . . . 20n calculates (at block 156) the receive signal interval as a function of the consistency group minimum freeze timeout time. As discussed, the calculated receive heartbeat interval 62 may comprise the consistency group minimum freeze timeout time 86 less then the freeze command runtime. In an alternative embodiment, the consistency manager 16 may calculate the receive heartbeat interval 62 and then transmit that calculated value to the copy managers 20a . . . 20n to use.

Figure 8:
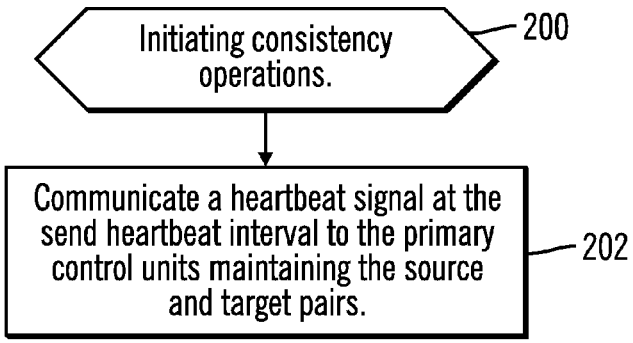
FIG. 8 illustrates an embodiment of operations performed by a consistency manager to send heartbeat signals to primary control units.

FIG. 8 illustrates an embodiment of consistency related operations performed by the consistency manager 16. The consistency manager 16 initiates consistency operations (at block 200) and communicates (at block 202) a heartbeat signal at the send heartbeat interval to the primary control units 4a . . . 4n maintaining the source and target pairs in the consistency group 82 (FIG. 5) being managed. The consistency manager 16 may send the heartbeat signals at the send heartbeat interval 88 (FIG. 5) rate to all primary control units 74*a* . . . 74*n* (FIG. 4) in all sessions 84 (FIG. 5) identified in the consistency group information 80 for the consistency group 82 being managed. The consistency manager 16 may perform such operations for multiple consistency groups.

Figure 9:
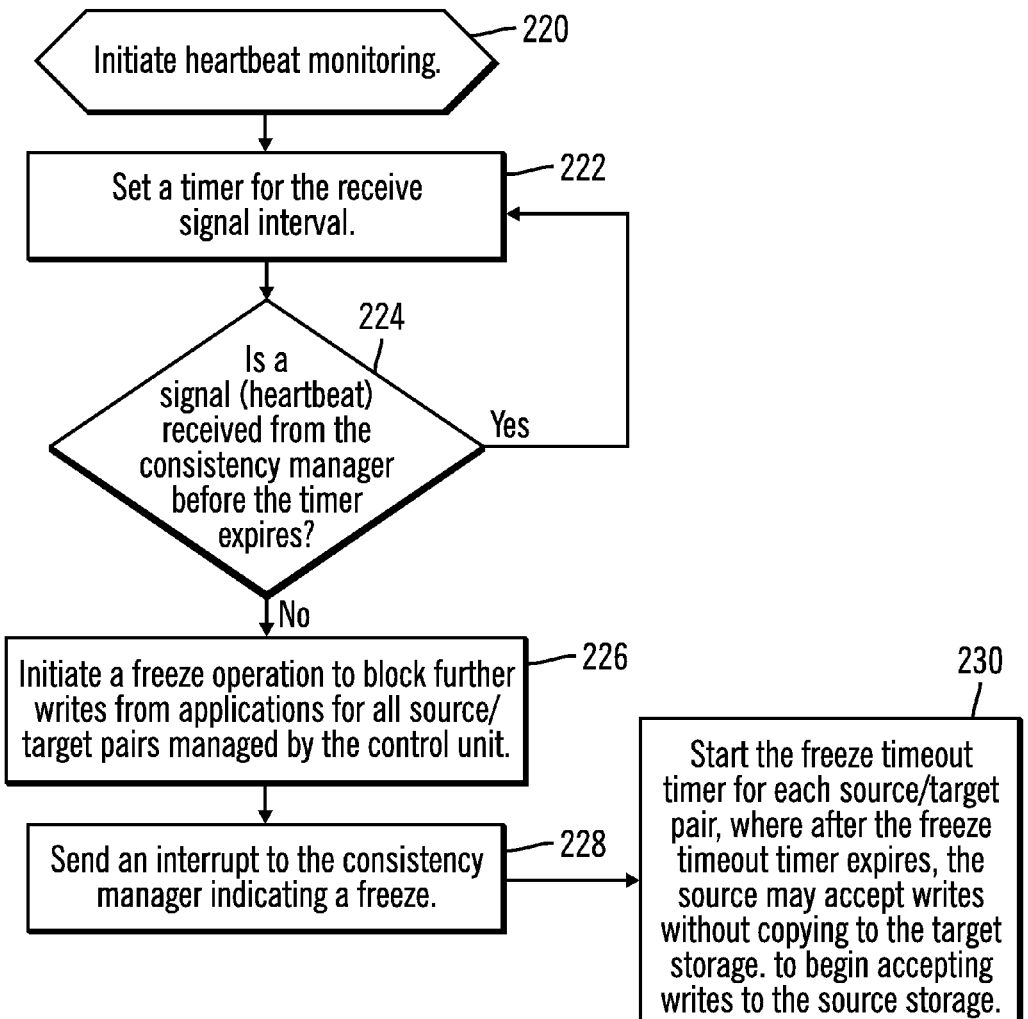
FIG. 9 illustrates an embodiment of operations for a primary control unit to monitor for heartbeat signals from a consistency manager to maintain data consistency.

FIG. 9 illustrates an embodiment of operations performed by the copy managers 20*a* . . . 20*n* to perform heartbeat signal management related operations. Upon initiating (at block 220) heartbeat signal monitoring from the consistency manager 16, the copy manager 20*a* . . . 20*n* sets (at block 222) a timer for the receive heartbeat interval 62 (FIG. 3). If (at block 224) a signal (heartbeat) is received from the consistency manager 16 before the timer expires, then control proceeds back to block 222 to reset the timer and wait for the next heartbeat. Otherwise, if a heartbeat signal is not received from the copy manager 20*a* . . . 20*n* within the timer period (receive heartbeat interval 62), then the copy manager 20*a* . . . 20*n* initiates (at block 226) a freeze operation to block further writes from applications 24 (FIG. 1) for all source/target pairs managed by the primary control unit 4*a* . . . 4*n*. The freeze operation may be sent to source/target pairs in the sessions registered with the copy manager 20*a* . . . 20*n*. In response to being blocked, the applications 24 would stop sending writes to any primary control unit 4*a* . . . 4*n* until the application 24 is notified that writes are allowed as part of the thaw operation. The copy manager 20*a* . . . 20*n* further sends (at block 228) an interrupt to the consistency manager 16 indicating a freeze. If the connection is available and the consistency manager 16 receives this interrupt, then the consistency manager 16 sends freeze commands to all the primary control units 4*a* . . . 4*n* in the consistency group including the primary control unit from which the interrupt was received. After commencing the freeze operation, the copy manager 20*a* . . . 20*n* starts (at block 230) the freeze timeout timer for each source/target pair, where after a freeze timeout timer expires, the source (primary control unit) may initiate the thaw procedure and accept writes for that source storage, e.g., LSS. After the freeze thaws, the copy manager 20*a* . . . 20*n* would not copy writes over to the target storage (secondary storage 12*a* . . . 12*n*), so that data consistency is maintained at the secondary (target) storages 12*a* . . . 12*n*.

In a further embodiment, if a source/target pair is added or removed to a consistency group 82 (FIG. 5), then the consistency manager 16 may perform the operations of FIG. 7 to recalculate the consistency group minimum freeze timeout time 86 to allow adjustment of the send 88 (FIG. 5) and receive 62 (FIG. 3) heartbeat intervals.

Described embodiments provide a technique to ensure that all primary control units having source/target pairs in a consistency group will all initiate freeze operations if one primary control unit initiates a freeze operation before any primary control unit thaws, or begins accepting writes after a freeze. With described embodiments, a primary control unit maintaining communication with a consistency manager initiates a freeze operation if the consistency manager sends a freeze command in response to being notified of a freeze command by another control unit. Alternatively, if a primary control unit loses its connection with the consistency manager, then that primary control unit would automatically begin a freeze operation if it did not receive a heartbeat signal from the consistency manager before any other primary control unit could thaw after its freeze timeout time.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 7, 8, and 9 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method processed by a computer system, comprising:
   maintaining a copy relationship associating a source storage and target storage pair, wherein writes received at the source storage are transferred to the target storage;
   calculating a receive signal interval as a function of a consistency group minimum freeze timeout time for copy managers residing in a plurality of control units less a freeze command runtime for a freeze operation to be implemented at the control units;
   sending out a signal at a higher frequency than the computed receive signal interval to the copy managers to ensure that the control units initiate freeze operations before other control units thaw and begin allowing write operations;
   determining whether the signal has been received from a consistency manager managing data consistency across multiple source storage and target storage pairs maintained by different of the control units within the receive signal interval;
   initiating the freeze operation to cease receiving writes at the source storage from an application in response to determining that the signal has not been received within the receive signal interval; and
   initiating a thaw operation to continue receiving writes submitted by the application at the source storage without transferring the writes from the application to the target storage after a lapse of a freeze timeout following the freeze operation to maintain data consistency at the target storages of the source and target storage pairs.

2. The method of claim 1, further comprising:
   receiving, from the consistency manager, the consistency group minimum freeze timeout time across the source and target storage pairs for which data consistency is maintained.

3. The method of claim 2, further comprising:
   communicating a freeze timeout for the maintained copy relationship to the consistency manager.

4. The method of claim 3, further comprising:
   using different freeze timeouts in the thaw operation for different managed copy relationships for different source and target pairs, wherein the communicated freeze timeout comprises the minimum of the different freeze timeouts.

5. A method processed by a computer system, comprising:
   maintaining information on multiple source storage and target storage pairs maintained by control units, wherein the control unit maintaining the storage pairs copies writes to the source storage to the target storage;
   managing data consistency across multiple source storage and target storage pairs maintained by the control units;
   determining freeze timeouts used by the control units maintaining the source and target pairs, wherein in response to a freeze operation with respect to one source and target pair managed by one of the control units, the control unit blocks writes to the source storage, wherein the control unit initiates a thaw operation to continue receiving write operations at the source storage after a lapse of the freeze timeout for the source and target pair in response to the freeze operation, and wherein after the thaw operation, received writes completed at the source storage are not transferred to the target storage;
   determining a send signal interval to the control units having a higher frequency than a receive signal interval to ensure that the control units initiate freeze operations before other of the control units thaw and begin allowing write operations wherein the receive signal interval is calculated as a function of a consistency group minimum freeze timeout time for control units less a freeze command runtime for a freeze operation to be implemented at the control units; and
   communicating a signal at the send signal interval to the control units maintaining the source and target pairs.

6. The method of claim 5, wherein the determined send signal interval is less than the minimum of the determined consistency group minimum freeze timeout time for the control units.

7. The method of claim 5, further comprising:
   sending the consistency group minimum freeze timeout time for the control units to each control unit.

8. The method of claim 5, wherein the combination of the consistency group minimum freeze timeout time sent to the control units and the receive signal interval ensures that the control units will freeze before any one of them thaws and permits application writes to continue so that the control units will not send further data to the target pair after any other primary control unit thaws.

9. A system in communication with a source storage, target storage, and an application, comprising:
   a plurality of control units;
   a consistency manager managing data consistency across multiple source storage and target storage pairs maintained by the control units;
   a copy relationship associating the source storage and the target storage pairs for the control units, wherein writes received at the source storage are transferred by the control unit to the target storage;
   wherein the control units communicate with the consistency manager and each perform operations, the operations comprising:
      calculating a receive signal interval as a function of a consistency group minimum freeze timeout time for copy managers residing in a plurality of control units less a freeze command runtime for a freeze operation to be implemented at the control units, wherein the consistency manager sends out a signal at a higher frequency than the calculated receive signal interval to the copy managers to ensure that the control units initiate freeze operations before other control units thaw and begin allowing write operations;
      determining whether the signal has been received from the consistency manager;
      initiating the freeze operation to cease receiving writes at the source storage from an application in response to determining that the signal has not been received within the receive signal interval; and
      initiating a thaw operation to continue receiving writes submitted by the application at the source storage without transferring the writes from the application to the target storage after a lapse of a freeze timeout following the freeze operation to maintain data consistency at the target storages of the source and target storage pairs.

10. The system of claim 9, wherein the control unit operations further comprise:
   receiving, from the consistency manager, the consistency group minimum freeze timeout time across the source and target storage pairs for which data consistency is maintained.

11. The system of claim 9, wherein the control unit operations further comprise:
   communicating a freeze timeout for the maintained copy relationship to the consistency manager.

12. The system of claim 9, wherein the consistency manager further performs:
   determining freeze timeouts used by control units maintaining the source and target pairs,
   determining a send signal interval to the control units having a higher frequency than a receive signal interval to ensure that the control units initiate freeze operations before other control units thaw and begin allowing write operations, wherein the receive signal interval is calculated as a function of a consistency group minimum freeze timeout time for the control units and a freeze command runtime for a freeze operation to be implemented at the control units; and
   communicating the signal at the send signal interval to the control units maintaining the source and target pairs.

13. The system of claim 12, wherein the determined freeze timeout for each of the control units comprises a minimum freeze timeout used in the control unit for the source and target pairs maintained by the control unit.

14. The system of claim 9, wherein the combination of the consistency group minimum freeze timeout time sent to the control units and the receive signal interval ensures that the control units will freeze before any one of them thaws and permits application writes to continue so that the control units will not send further data to the target pair after any other primary of the control units thaws.

15. An article of manufacture including code executed in a system in communication with a consistency manager, a source storage, a target storage, and an application, wherein the code is executed to perform operations, the operations comprising:
   maintaining a copy relationship associating a source storage and target storage pair, wherein writes received at the source storage are transferred to the target storage;
   calculating a receive signal interval as a function of a consistency group minimum freeze timeout time for copy managers residing in a plurality of control units less a freeze command runtime for a freeze operation to be implemented at the control units;
   sending out a signal at a higher frequency than the calculated receive signal interval to the copy managers to ensure that the control units initiate freeze operations before other of the control units thaw and begin allowing write operations;
   determining whether the signal has been received from the consistency manager managing data consistency across multiple source storage and target storage pairs maintained by different of the control units within a receive signal interval;
   initiating the freeze operation to cease receiving writes at the source storage from an application in response to determining that the signal has not been received within the receive signal interval; and
   initiating a thaw operation to continue receiving writes submitted by the application at the source storage without transferring the writes from the application to the target storage after a lapse of a freeze timeout following the freeze operation to maintain data consistency at the target storages of the source and target storage pairs.

16. The article of manufacture of claim 15, wherein the operations further comprise:
   receiving, from the consistency manager, the consistency group minimum freeze timeout time across the source and target storage pairs for which data consistency is maintained.

17. The article of manufacture of claim 16, wherein the operations further comprise:
   communicating a freeze timeout for the maintained copy relationship to the consistency manager.

18. The article of manufacture of claim 17, wherein the operations further comprise:
   using different freeze timeouts in the thaw operation for different managed copy relationships for different source and target pairs, wherein the communicated freeze timeout comprises the minimum of the different freeze timeouts.

19. An article of manufacture including code executed in a system in communication with a plurality of control units, source storages, target storages, and an application, wherein the code is executed to perform operations, the operations comprising:
   maintaining information on multiple source storage and target storage pairs maintained by the control units, wherein the control unit maintaining the storage pairs copies writes to the source storage to the target storage;
   managing data consistency across multiple source storage and target storage pairs maintained by the control units;

determining freeze timeouts used by the control units maintaining the source and target pairs, wherein in response to a freeze operation with respect to one source and target pair managed by one of the control units, the control unit blocks writes to the source storage, wherein the control unit initiates a thaw operation to continue receiving write operations at the source storage after a lapse of the freeze timeout for the source and target pair in response to the freeze operation, and wherein after the thaw operation, received writes completed at the source storage are not transferred to the target storage;

determining a send signal interval to the control units having a higher frequency than a receive signal interval to ensure that the control units initiate freeze operations before other of the control units thaw and begin allowing write operations, wherein the receive signal interval is calculated as a function of a consistency group minimum freeze timeout time for the control units less a freeze command runtime for a freeze operation to be implemented at the control units; and communicating a signal at the send signal interval to the control units maintaining the source and target pairs.

20. The article of manufacture of claim 19, wherein the combination of the consistency group minimum freeze timeout sent to the control units and the receive signal interval ensures that the control units will freeze before any one of them thaws and permits application writes to continue so that the control units will not send further data to the target pair after any other primary control unit thaws.

* * * * *